Figure 1:
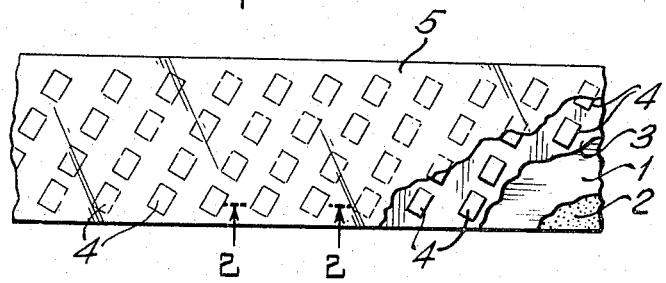
Figure 2:
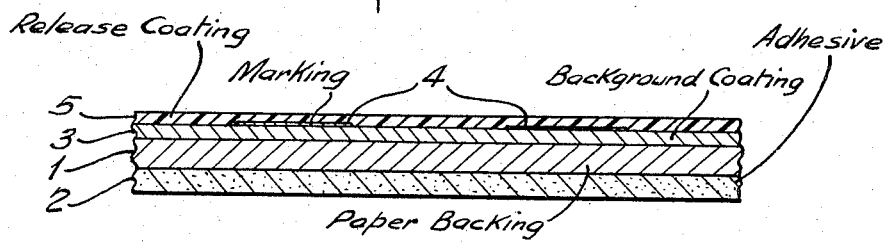

March 28, 1967 — M. I. EDENBAUM — 3,311,084

INDICATOR TAPE

Filed Dec. 24, 1964

INVENTOR.
MARTIN I. EDENBAUM
BY
Harold L. Warner
ATTORNEY

United States Patent Office

3,311,084
Patented Mar. 28, 1967

3,311,084
INDICATOR TAPE
Martin I. Edenbaum, Somerset, N.J., assignor to Johnson & Johnson, a corporation of New Jersey
Filed Dec. 24, 1964, Ser. No. 420,864
5 Claims. (Cl. 116—114)

The present invention relates to pressure-sensitive adhesive tapes and, more particularly, to pressure-sensitive adhesive tapes containing on the back thereof markings which change color when subjected to steam sterilizing conditions, the tapes having particular utility in the packaging of articles which are to be steam sterilized.

In the normal operation of hospitals, clinics and the like, various products such as gowns, sheets, drapes, etc. which are required during surgery, or other aseptic procedures, must be used in a sterile condition. Where such materials are not pre-packaged in a sterile state, it is necessary for the hospital or clinic to sterilize the same before use. Where the materials are not disposable and are employed more than once, it is necessary that the same be laundered and otherwise prepared for subsequent use. Prior to such use, however, it is essential that such materials be sterilized. Due to the volume of materials involved, it is necessary to store these materials for use as desired. There has been developed a procedure where such materials, after laundering and the like, are packaged in ready units for subsequent use, and the package then sterilized and stored. As may be apparent, there is a potential danger in such a procedure. There is a prospect of unsterilized packages becoming mixed with sterilized packages stored for use.

To prevent unsterilized products from being used by the physician or attendant requiring sterile materials, there have been developed various types of sterility indicators which are attached to, or incorporated into, the package. This permits a user to immediately determine whether a particular package has been passed through the sterilizer. Although such sterility indicators have, in many instances, been placed in the package or attached to the package, the most convenient way of applying such sterility indicators is to have the sterility indicators carried by pressure-sensitive adhesive tape used for holding the package together.

Conventional pressure-sensitive adhesives are somewhat thermoplastic and tend to overly soften and flow at the temperatures and conditions of steam sterilization, where an article is subjected to a temperature of about 250° F. for about one-half hour. In order to prevent such flow, the adhesive should be one that is resistant to flow at temperatures up to 275° F.

In U.S. Patent No. 2,889,799 are described pressure-sensitive adhesive tapes carrying such color change indicators in which the pressure-sensitive adhesive of the tape also contains a heat activable curing agent which is at least partially cured by the heat during steam sterilization to stiffen up the adhesive, and make the same more resistant to softening and flow during the steam sterilization. In the examples given in U.S. Patent 2,889,799 the heat activable curing agent is cured in the adhesive, while the tape is exposed to the elevated temperatures during sterilization. As the adhesive qualities of a pressure-sensitive adhesive containing a heat activable curing agent are effected by the curing of such agent, it is preferred to cure the adhesive during the manufacture of the pressure-sensitive adhesive tape to provide a tape of more constant adhesion characteristics during later use. This, however, brings up numerous problems in the manufacture of the tape, as the inks used are designed to change color under the conditions of elevated temperature encountered during steam sterilization. Color change, however, must be avoided during the heat curing of the heat activable adhesive. Even where a heat activable curing agent may not be incorporated in the pressure-sensitive adhesive, but the pressure-sensitive adhesive made resistant to softening at the temperatures of steam sterilization through other means, such as catalyzed crosslinking of the pressure-sensitive adhesive, it is still, in many instances, desirable to use a release coating on the back of the pressure-sensitive adhesive tape. Release coatings which have been found to be particularly suitable for tapes, which are to be subjected to elevated temperatures, are those formed of a heat curable film-forming resin containing a release material therein. However, here again, the problem of completing the manufacture of the tape, without premature color change, is encountered because of the heat curing step involved.

Some release coatings of this type are described, for example, in U.S. Patent 3,067,057.

In order to avoid deterioration of the color change markings or appreciable color change during the heat curing step, it is necessary to employ a dry heat and use color change indicators that are stable under dry heat conditions of up to 325° F. Such color change indicators are disclosed, for example, in my copending application Ser. No. 421,078, filed Dec. 12, 1964.

It is highly desirable to have on the back of the pressure-sensitive adhesive indicator tape a good base, or background color, against which the color change of the markings can be readily observed. It has been the practice to provide this background by coating the flexible backing of the pressure-sensitive adhesive tape with a nitrocellulose film containing a pigment to give the desired background color. Where a white background is desired titanium oxide has been found to make an excellent pigment for this purpose. However, nitrocellulose, although an excellent film-former for this pigmented background coating cannot be used under the dry heat conditions, at temperatures of about 250° F., without substantial fire hazard. A temperature of 250° F. or even 275° F. is substantially below the temperatures needed to properly cure adhesives containing a heat activable curing agent, or the heat activable release coatings referred to. It has thus been particularly difficult to prepare heat cured pressure-sensitive adhesive tapes, where the heat cured tape contains color change markings which have not as yet reacted to change color but will change color when the heat cured tape is subjected to steam sterilizing conditions.

It is, accordingly, an object of the present invention to prepare heat cured pressure-sensitive adhesive coated tapes having color change markings thereon which change color under the conditions of steam sterilization. It is a further object of the present invention to prepare heat cured pressure-sensitive adhesive tapes containing color change markings, in which the color change markings are firmly anchored to a pigmented substrate. It is a still further object of the present invention to make pressure-sensitive adhesive coated tapes in which the pressure-sensitive adhesive is resistant to flow at temperatures up to 250° F., and which contain color change markings which will change color when subjected to steam sterilization conditions.

Other objects and advantages of this invention will become apparent from the following description wherein are set forth by way of illustration and example certain embodiments of this invention.

Steam sterilization is accomplished by keeping an article to be sterilized in a steam environment at a temperature of at least 250° F. for about one-half hour. Any color change indicator may be used for this purpose which will show a marked change in color under steam sterilizing conditions. Several such color change indicators are described, for example, in U.S. Patent No. 2,889,799, lead oxide and sulphur being an example of a color change indicator which has heretofore been commonly used. For practicing the present invention, however, the color change indicator must be stable to color change under conditions of dry heat at temperatures up to 325° F. Indicators formed of lead oxide and sulphur, accordingly, are not satisfactory for this purpose, as the markings are not sufficiently stable under such dry heat conditions. The preferred color change indicators for practicing the present invention are those described in copending application Ser. No. 421,078 because of their excellent resistance to deterioration under dry heat conditions, and the excellent color changes which they give under the conditions of steam sterilizing.

The active color change ingredients are applied in the form of an ink which contains a film-forming carrier for the active color change ingredients. This film-forming carrier must be pervious to steam after the ink has dried, in order to obtain the color change desired. The best results are obtained by use of vinyl base inks in which the carrier for the active color change ingredients is a vinyl resin. Copolymers of polyvinyl chloride and polyvinyl acetate are the preferred film-forming vinyl resins.

The figure in the drawing represents a side edge view of an indicator tape made in accordance with the present invention. The backing 1 may be any conventional flexible backing material and is preferably a paper having a wet strength of at least 6 lbs./in. and a dry strength of at least 16 lbs./in. A normally tacky cured pressure-sensitive adhesive 2 is contained on one side of the backing. On the other side of backing 1 is a pigmented background coating 3, which contains a base color selected to more clearly point up the color change in color change ink markings 4 which are formed thereon. As previously indicated, the preferred background color for the film 3 is white, which color is readily obtained through the use of a white pigment, such as titanium oxide.

In the preferred construction, the tape also contains a cured release coating 5, which extends over the background coating 3 and color change indicia 4 to reduce the pull required to unwind the tape where wound on itself in roll form.

As previously indicated, the conventional pigmented nitrocellulose coatings could not be used for forming the background coating 3 because of the inflammable nature of the nitrocellulose under dry heat conditions. After substantial effort it was discovered that styrene butadiene latices could be used as the pigment carrier for forming the background coating 3. The styrene butadiene latices when mixed with a white pigment, such, for example, as titanium oxide, form a white coating which adheres strongly to the flexible paper backing. Further investigation disclosed that, although the styrene butadiene latices were preferred for forming the background coating, other easily pigmented latices could also be used for this purpose. However, the difficulty with these latex background coatings was that the vinyl base ink markings containing the color change ingredients would not satisfactorily adhere to the pigmented latex background coating, the markings tending to be lifted off by the pressure-sensitive adhesive on unwinding the tape. This appeared to occur even when covered by a cured release coating such as release coating 5.

It was further discovered, however, that if small amounts of the styrene butadiene latices, or other latex being used, was added to the color change indicator ink, the ink markings adhered firmly when applied to the latex background coating 3. This was indeed surprising as when attempts were made to solve the problem by using the latex as the base for the ink, the addition of small amounts of color change ingredients invariably precipitated out the solids of the latex into a gel, making the same completely unusable. Another surprising aspect of this solution to the problem is that, despite the fact that the addition of small amounts of latex to the ink involved including in the ink small amounts of water, the active color change ingredients, nevertheless, did not appear to deteriorate or change color during the heating step later used to cure the pressure-sensitive adhesive tape.

Good anchorage of the ink to the background coating is also obtained by using for the ink carrier a vinyl resin containing mixed therewith substantial amounts of methacrylate resin, either polymer or copolymer, where the major monomer is methacrylate, polymerized to give a substantially brittle resin product. The preferred blend is a 50–50 mixture. With amounts of methacrylate resin in excess of about 75% by weight of the mixture, the base makes an unsatisfactory pigment vehicle. With amounts of methacrylate resin much below 25% by weight of the mixture of methacrylate and vinyl, poor adherence to the background coating is obtained.

The ink carrying the color change ingredients from which markings 4 are formed is made up of a vinyl base resin, such, for example, as Bakelite resin VYHH, a copolymer of polyvinyl chloride and polyvinyl acetate, or a blend of the same, with a brittle methacrylate resin such as Acryloid A–11, the same being dispersed in a suitable solvent. Suitable solvents, for example, are toluene, methyl ethyl ketone, and acetone, the preferred solvent being methyl isobutyl ketone. The amount of base resin carrier used with respect to the amount of color change pigment will vary depending on the density of change desired, and the particular color change pigments used. It is generally preferred, however, to have at least 5 parts by weight of the color change ingredients on a reactive molar basis per part by weight of the vinyl carrier with inks of the type used in the example given. The base resin carrier for the ink can be diluted to any desired degree by the organic solvent, although it is generally preferable to have the solvent held to the minimum necessary to give the desired flow for marking or printing. Where the base resin does not comprise the mixture of vinyl resin and methacrylate, the latex should be added in amounts of about 15 to 30 percent based on the weight of vinyl carrier present. Thus the marking ink would generally contain about 5 to 8 parts by weight of the color change indicator and 1/3 to 1/2 parts by weight of the latex per part by weight of the vinyl carrier with sufficient organic solvent to give the desired viscosity. Generally about 20 parts by weight solvent to 1 part by weight vinyl carrier is found to be satisfactory.

Although there is no problem with pick-off of the color change markings 4 when applied in the manner described, because of their firm adherence to the pigmented background latex coating 3, in the preferred tape construction, it is also desirable to include a release coating such as illustrated at 5 in the figure, to reduce the mechanical pull required in unrolling sections of the tape. This release coating may, for example, be a conventional release coating such as the chrome complex sold under the trade name Quilon by E. I. du Pont de Nemours & Co. and described in their Bulletin "Quilon Chrome Complex," Bulletin #A18204, or a cured polymer film containing release ingredients such, for example, as described in U.S. Patent 3,067,057.

In making the color change indicator tapes, the backing is first completed, that is the color change markings are placed thereon and the release coating is then spread over the backing and markings where a release coating is used. The other side of the backing is then spread with the pressure-sensitive adhesive. Accordingly, the ink markings 4 are already present on the tape backing prior to any heat curing step which is needed to cure either the release coating 5 or the pressure-sensitive adhesive 2 containing the heat activable curing agent. After the pressure-sensitive adhesive containing the heat activable curing agent therein has been applied to the tape, the same is cured by heating in a dry heat to a temperature of about 325° F. for about one minute. The heating conditions must be substantially dry, however, otherwise the color change ingredients in the ink markings will undergo a color change during the curing process.

Examples of heat activable curing agents that can be incorporated into the pressure-sensitive adhesive are conventional vulcanizing agents for such elastomeric polymers as used in preparing the adhesves as, for example, the thiuram polysulfides such as "Tuads" and "Tetrone A" or may comprise heat-advancing rubber reactive resins, such as the oil-soluble phenolic-aldehyde resins preferably formed from para alkyl substituted phenols. Such heat-activable curing agents are employed in amounts sufficient to render the adhesive resistant to softening, upon exposure to elevated temperatures, due to the mechanism of the curing agent hardening the adhesive composition to balance the effect of the heat upon an otherwise thermoplastic composition. Preferably the vulcanizing type curing agents are employed in amounts of about ½ to 5 parts per 100 of elastomer, and the resinous type curing agents are employed in amounts up to approximately 30 parts per 100 parts of elastomer, all by weight.

The following example, which is given for purpose of illustration only, further illustrates the practice of the present invention.

EXAMPLE

A vehicle of the following formulation is prepared:

| | Parts |
|---|---|
| Bakelite resin VYHH (copolymer of polyvinyl chloride and polyvinyl acetate) | 1.0 |
| MIBK (methyl isobutyl ketone solvent) | 2.75 |

The following compounds are ground into 100 parts of this vehicle on a three roll ink mill:

| | Parts |
|---|---|
| Zinc sulfide | 30 |
| Lead chloride | 90 |
| Cationic wetting agent | 5 |
| Ammonium sulfate | 5 |

This ink is diluted with an equal weight of MIBK. Then, 5 parts of styrene butadiene latex (SBR latex) are added to the ink for every 200 parts of the diluted ink. An ink with a Zahn #2 viscosity of 27 seconds is obtained. Wherever "parts" are used, it refers to parts by weight.

A backsize of the following formulation is prepared:

| | Parts |
|---|---|
| SBR latex (50%) | 150 |
| Titanium dioxide | 50 |
| Water | 100 |

This is coated by means of an air-knife on 30# stock paper to give a coating weight of 0.35 oz./yd.² The coated backing is dried at temperatures of 225–275° F. for about thirty seconds.

The dried, coated backing is then printed with the above ink by rotogravure, using an engraved roll which has been etched in a pattern of small diamonds arranged in straight rows running at a 60° angle to the direction of the coated backing. The printing ink solvent is flashed off at about 150° F.

The printed backing is then release coated with a curing backsize of an acrylic polymer film former and stearyl methacrylate as release agent and cured at 325° F. for thirty seconds. A heat curing rubber base pressure-sensitive adhesive containing about 7% by weight phenol formaldehyde resin as the heat curing additive is then applied to the uncoated side of the backing and cured at 325° F. for about one minute.

A pressure-sensitive tape of the same general construction as described above, cut into one inch widths, is placed in storage at normal atmospheric conditions (RT storage) and in a room kept at 150° F. The tape samples are tested at regular intervals with the following results.

RT STORAGE

| Weeks in Storage | Ink Color Before Autoclaving | Ink Color After Autoclaving 250° F., 30 min. | Ink Color After Autoclaving 215° F., 30 min. | Ink Off-Setting |
|---|---|---|---|---|
| 0 | White | Black | Grey | None. |

150° F., 35% Relative Humidity Storage

| | | | | |
|---|---|---|---|---|
| 0 | White | Black | Grey | None. |

Particular embodiments of the invention have been used to illustrate the same. The invention, however, is not limited to these specific embodiments. In view of the foregoing disclosure, variations and modifications thereof will be apparent, and it is intended to include within the invention all such variations and modifications except as do not come within the scope of the appended claims.

Having thus described my invention, I claim:

1. A heat cured pressure-sensitive adhesive sheet suitable for use as a sterility indicator comprising a backing, a pressure-sensitive adhesive coating dry heat cured on one side of said backing and being resistant to flow at temperatures up to 275° F., and a heat modifiable marking on the other side of said backing said heat modifiable marking being stable to dry heat at temperatures up to at least about 325° F. and changing in color when said tape is subjected to the conditions of steam sterilization.

2. A heat cured pressure-sensitive adhesive sheet suitable for use as a sterility indicator comprising a backing, a pressure-sensitive adhesive coating on one side of said backing, heat modifiable markings on the other side of said backing said heat modifiable marking being stable to dry heat at temperatures up to at least about 325° F. and changing in color when said tape is subjected to the conditions of steam sterilization, and a release coating on the side of said backing opposite said pressure-sensitive adhesive and covering said heat modifiable markings, at least one of said coatings containing a dry heat cured heat activable resin and having been dry heat cured on said backing.

3. A heat cured pressure-sensitive adhesive sheet comprising a flexible backing, a pressure-sensitive adhesive coating dry heat cured on one side of said backing, the adhesive of said coating being resistant to flow at temperatures up to 275° F., a background coating on the other side of said flexible backing formed of styrene-butadiene polymer film containing a pigment dispersed therethrough, and heat modifiable markings comprising color change pigments in a vinyl resin carrier firmly anchored to said background coating.

4. A heat cured pressure-sensitive adhesive sheet of claim 3 in which the vinyl resin carrier of said heat modifiable markings contains a small amount of butadiene polymer.

5. A heat cured pressure-sensitive adhesive sheet of claim 3 in which said carrier of said heat modifiable markings consist essentially of an intimate mixture of vinyl resin and a brittle resin methacrylate the methacrylate resin consisting of about 25 to 75 parts by weight of the carrier.

References Cited by the Examiner

UNITED STATES PATENTS

| | | | |
|---|---|---|---|
| 2,118,144 | 5/1938 | Berman et al. | 116—114.20 |
| 2,278,673 | 4/1942 | Savada et al. | 161—82 |
| 2,308,087 | 1/1943 | Lappala | 116—114.20 X |
| 2,614,430 | 10/1952 | Ballard et al. | 116—114.20 X |
| 2,782,749 | 2/1957 | Beckett et al. | 116—114.20 |
| 2,789,096 | 4/1957 | Bruno et al. | 117—122 |
| 2,799,167 | 7/1957 | Loconti | 73—356 |
| 2,826,073 | 3/1958 | Huyck et al. | 73—356 |
| 2,889,799 | 6/1959 | Korpman | 116—114.20 |
| 2,918,033 | 12/1959 | Snyder | 116—114.19 |
| 2,932,971 | 4/1960 | Moore et al. | 116—114.19 |
| 2,998,306 | 8/1961 | Huyck et al. | 23—254 |
| 3,059,474 | 10/1962 | Keller et al. | 73—358 |
| 3,067,057 | 12/1962 | Dabroski | 117—68.5 |
| 3,079,278 | 2/1963 | Naudain | 117—122 |
| 3,089,786 | 5/1963 | Nachtsheim et al. | 117—122 |
| 3,231,419 | 1/1966 | Korpman | 117—122 |

LOUIS J. CAPOZI, *Primary Examiner.*